2 Sheets—Sheet 1.

J. H. MUDGETT,

Assignor, by mesne assignments, to C. COLAHAN.

Grain Binder.

No. 9,280. Reissued July 6, 1880.

*WITNESSES*

Wm A Skinkle

Geo W Breck

*INVENTOR*

*J. H. Mudgett*

*By his Attorneys*

Baldwin Hopkins & Peyton

N. PETERS, PHOTO-LITHOGRAPHER, WASHINGTON, D. C.

2 Sheets—Sheet 2.

J. H. MUDGETT,

Assignor, by mesne assignments, to C. COLAHAN.

Grain Binder.

No. 9,280. Reissued July 6, 1880.

WITNESSES

Wm A Skinkle

Geo. W. Breck.

INVENTOR

J. H. Mudgett.

By his Attorneys

Baldwin Hopkins & Peyton

N. PETERS, PHOTO-LITHOGRAPHER, WASHINGTON, D. C.

UNITED STATES PATENT OFFICE.

JOSEPH H. MUDGETT, OF CAMANCHE, IOWA, ASSIGNOR, BY MESNE ASSIGNMENTS, TO CHARLES COLAHAN, OF CLEVELAND, OHIO.

GRAIN-BINDER.

SPECIFICATION forming part of Reissued Letters Patent No. 9,280, dated July 6, 1880.

Original No. 95,714, dated October 12, 1869. Application for reissue filed April 10, 1879.

*To all whom it may concern:*

Be it known that I, J. H. MUDGETT, a citizen of the United States, residing at Camanche, in the county of Clinton and State of Iowa, have invented certain new and useful Improvements in Grain-Binders, of which the following is a specification.

My improvement consists in certain novel combinations of old devices, constituting the subject-matter hereinafter set forth.

To carry out the objects of my invention I so organize the mechanism that an endless apron or grain-carrier delivers the grain in a continuous stream into a receptacle traversed by a gaveling and band-carrying device, which separates the stream of grain into gavels and compresses them successively against suitable stops while being bound, which stops are then moved out of the way to permit of the discharge of the bound bundle. The gaveling and band-carrying device is actuated automatically and provided with a clutch operated by a lever under the control of the attendant, which enables him to stop and start the gaveling and band-carrying device when desired without interfering with the action of the grain-carrier. A suitable detent prevents the backward movement of the gaveling and band-carrying device, and holds it positively in position while the bundle is being bound.

Figure 1:
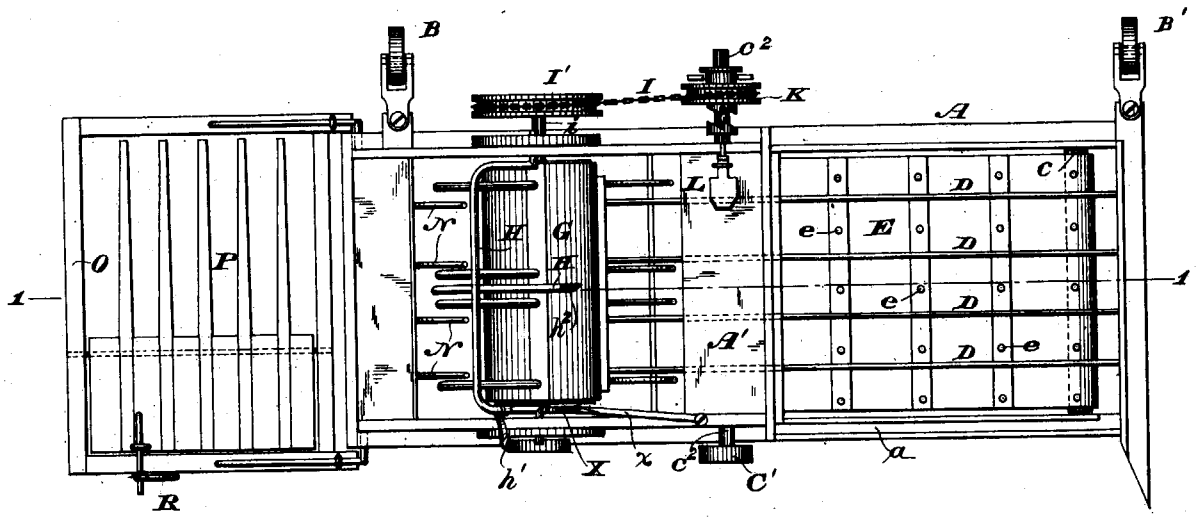
Figure 3:
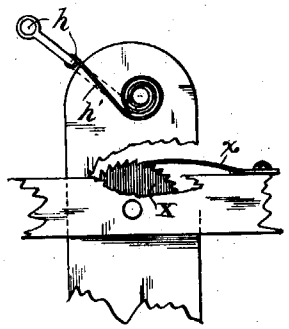
Figure 2:
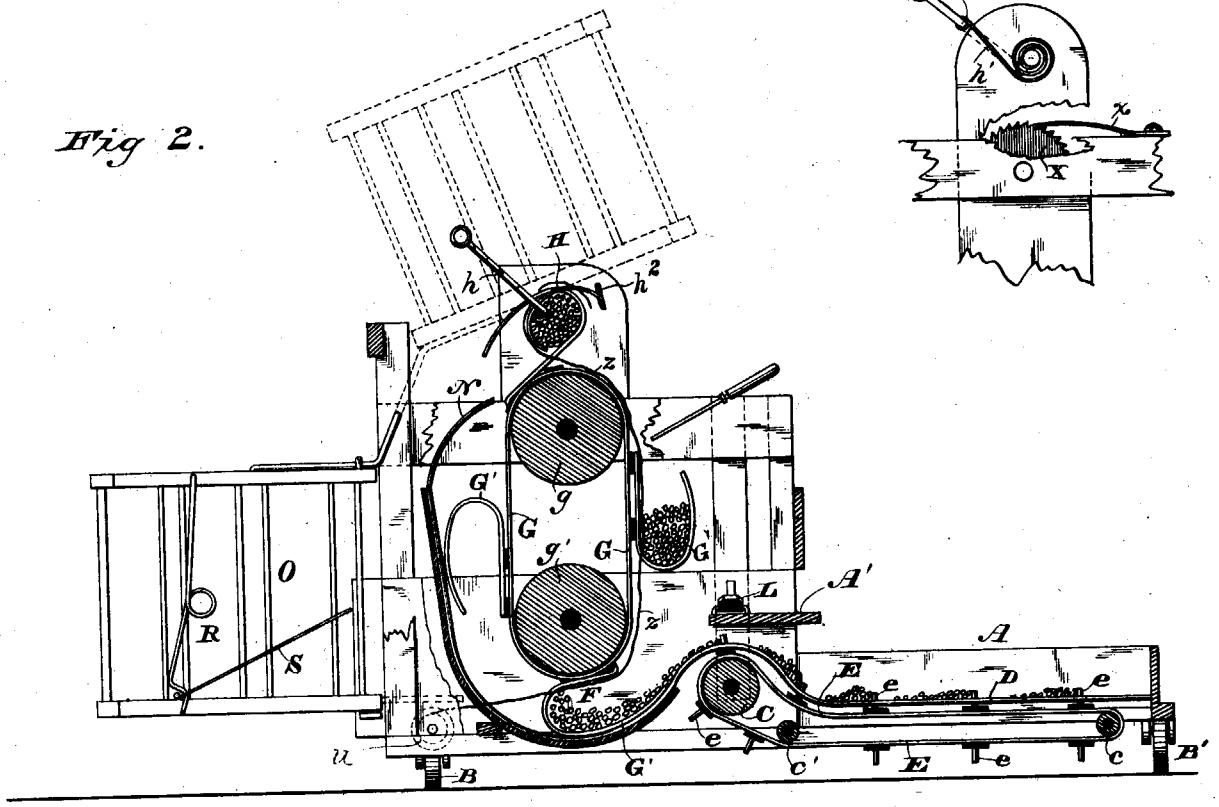

In the accompanying drawings, which show so much of the apparatus as is necessary to illustrate the subject-matter herein claimed, Figure 1 represents a plan or top view of my improved machine; Fig. 2, a vertical longitudinal section therethrough on the line 1 1 of Fig. 1, and Fig. 3 a detail view of the stop which holds the gavel while being bound and of the detent which prevents the backward movement of the gaveling and band-carrying device.

The mechanism is shown as mounted on a stout frame, A, supported on caster-wheels B B′, and designed to have its front bar, *a*, attached to the finger-beam or sickle-bar of a reaping-machine.

Under the organization shown the grain falls as it is cut upon a series of transverse rods, D, under which an endless belt or grain-carrier, E, traverses around rollers *c c′* C, and is provided with teeth *e*, projecting above the rods D, to carry the grain along and deliver it into the receptacle. The roller C is driven by a belt from any suitable part of the machine, encircling a pulley, C′, on a shaft, $c^2$, on said roller. An endless belt or apron, G, traversing pulleys *g g′*, mounted in suitable bearings on the frame, carries hooked arms G′, which traverse a grain-receptacle, F, passing across the inflowing stream of grain from the carrier, thus effecting the proper separation and condensation of the gavel, and carrying it until it comes in contact with a stop, H, supported on a transverse crank-shaft and normally maintained in proper position for holding the gavel while being bound by a spring, *h′*.

The binding material is wound on a spool, U, mounted in a suitable position on the frame, and is carried by the endless apron G, carrying the hooked arms G′, to which apron it adheres by frictional contact, the apron and hooked arms thus constituting a gaveling and band-carrying device.

The shaft $c^2$ of the inner roller carries a wheel or pulley, K, geared therewith by a clutch for ready connection or disconnection, said clutch-wheel being controlled by a spring foot-treadle, L, which instantly throws the wheel out of connection when the foot is taken off. This treadle is shown as pivoted on a bridge or foot-board, A′, on the frame.

A driving-chain, I, encircling the wheel K, drives a corresponding pulley, I′, on a shaft, *i*, of the roller *g*, the opposite end of which shaft carries a ratchet-wheel, X, acted on by a pawl, *x*, constituting a detent to prevent backward movement of the gaveling and band-carrying device when disengaged from the grain-carrying mechanism and to hold it positively while the gavel is being bound. The attendant is thus able, by means of the clutch, to control the size of the gavels and the frequency of their formation without interrupting the continuous action of the grain-carrier.

Under the organization shown in the drawings the band-carrying and gaveling device normally remains out of gear. When the carrier has delivered a sufficient amount of grain the attendant, by means of the clutch and foot-treadle, throws the gaveling and band-carrying device into gear and causes it to move forward until the grain, condensed and separated into a gavel by one set of arms, encounters the stop H, which arrests the gavel at the right moment for binding, the gaveling and band-carrying device being simultaneously thrown out of gear by means of the clutch, and retained in position by the detent. The band, being first cut to a proper length by means of a knife mounted on one of the prongs of the stop H, is then secured around the bundle by the attendant standing on the bridge A′, the bound bundle being ejected from the stop by a sudden jerk of the operator, moving the stop out of the way.

Guards N on the frame guide the bound bundles into a box or rack, O, provided with a tilting or dumping bottom, P, held in proper position by a spring-catch, R, actuated by a tripping-cord, S, within reach of the attendant. The accumulated bundles are discharged from this box through its trap-door or bottom, when required, by the operator retracting the spring-catch R. The door being eccentrically pivoted, the preponderance of weight on one side causes it to tilt and drop the bundles, when the door closes again by its own gravity. The box O is connected with the frame so as to swing over the top thereof when required, as shown by the dotted lines in Fig. 2.

I claim as of my own invention—

1. The combination, substantially as herein set forth, of a continuously-acting grain-carrier, a traversing gaveling and band-carrying device, automatic mechanism actuating them, a clutch to stop and start said device, and a detent to prevent its backward movement.

2. The combination, substantially as herein set forth, of a continuously-acting grain-carrier, a traversing gaveling and band-carrying device, automatic mechanism actuating them, a clutch to control the action of said device, a detent to prevent its backward movement, and a stop which holds the gavel while being bound and is then moved out of the way to permit its discharge.

3. The combination, substantially as herein set forth, of a continuously-acting grain-carrier, a grain-receptacle, a gaveling and band-carrying device traversing it, automatic mechanism actuating the carrier and gaveling and band-carrying device, a clutch in the actuating mechanism to control said device, a lever controlled by the driver for actuating the clutch, a detent to prevent backward movement of the gaveling and band-carrying device, and a stop which holds the gavel while being bound and is then moved out of the way to permit of its discharge.

JOSEPH H. MUDGETT. [L. S.]

Witnesses:
GEO. TONG,
W. H. HOYT.